Aug. 2, 1932.  J. J. STEVENS  1,869,923
ATTACHMENT FOR LISTERS
Filed July 17, 1930  2 Sheets-Sheet 1

Inventor
J. J. Stevens
By C. A. Snow & Co.
Attorneys

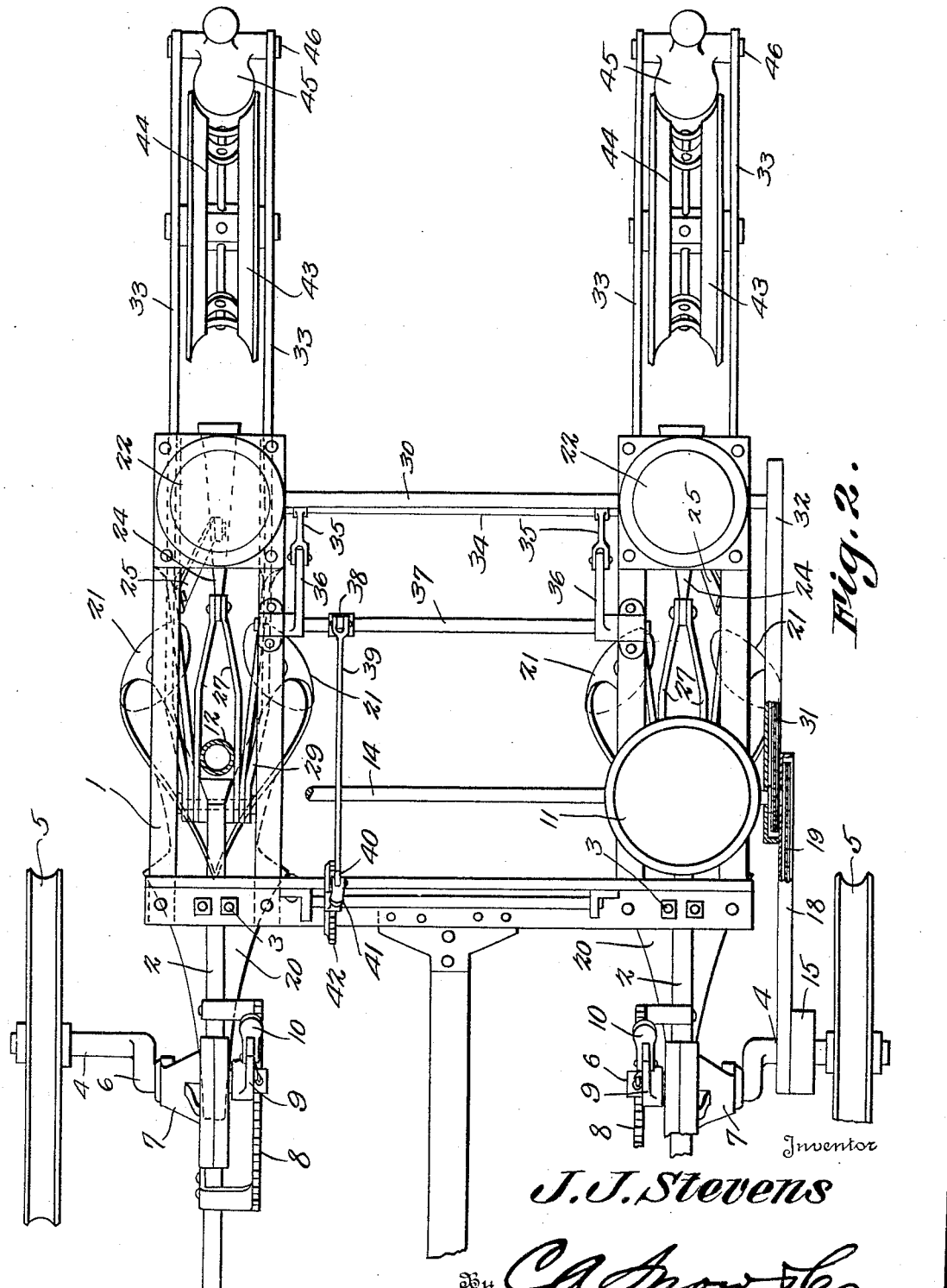

Patented Aug. 2, 1932

1,869,923

UNITED STATES PATENT OFFICE

JOSEPH J. STEVENS, OF DALTON, KANSAS

ATTACHMENT FOR LISTERS

Application filed July 17, 1930. Serial No. 468,619.

By way of explanation, it may be stated that listers as at present constructed drop the seed at the bottom of the furrow, in a place in the soil which is hard and cold. Ordinarily, the seed is planted too deeply, and in dry weather the moisture evaporates. In case a rainy season intervenes, before the seed has come up, the seed is likely to be kept wet and cold too long, since the sub-soil is slow to let the water soak away, the result being that if the plant is not killed, it is stunted, and if the seed has not sprouted, the chances are that it will rot, a replanting being necessary.

The foregoing being understood, it may be stated that it is the object of the present invention to provide a novel lister attachment so constructed that the seed will be planted in a prepared bed in the furrow, at a much reduced depth.

It is within the province of the disclosure to improve generally and to enhance the utility of devices of that type to which the present invention appertains.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 2 is a top plan.

Figure 1:
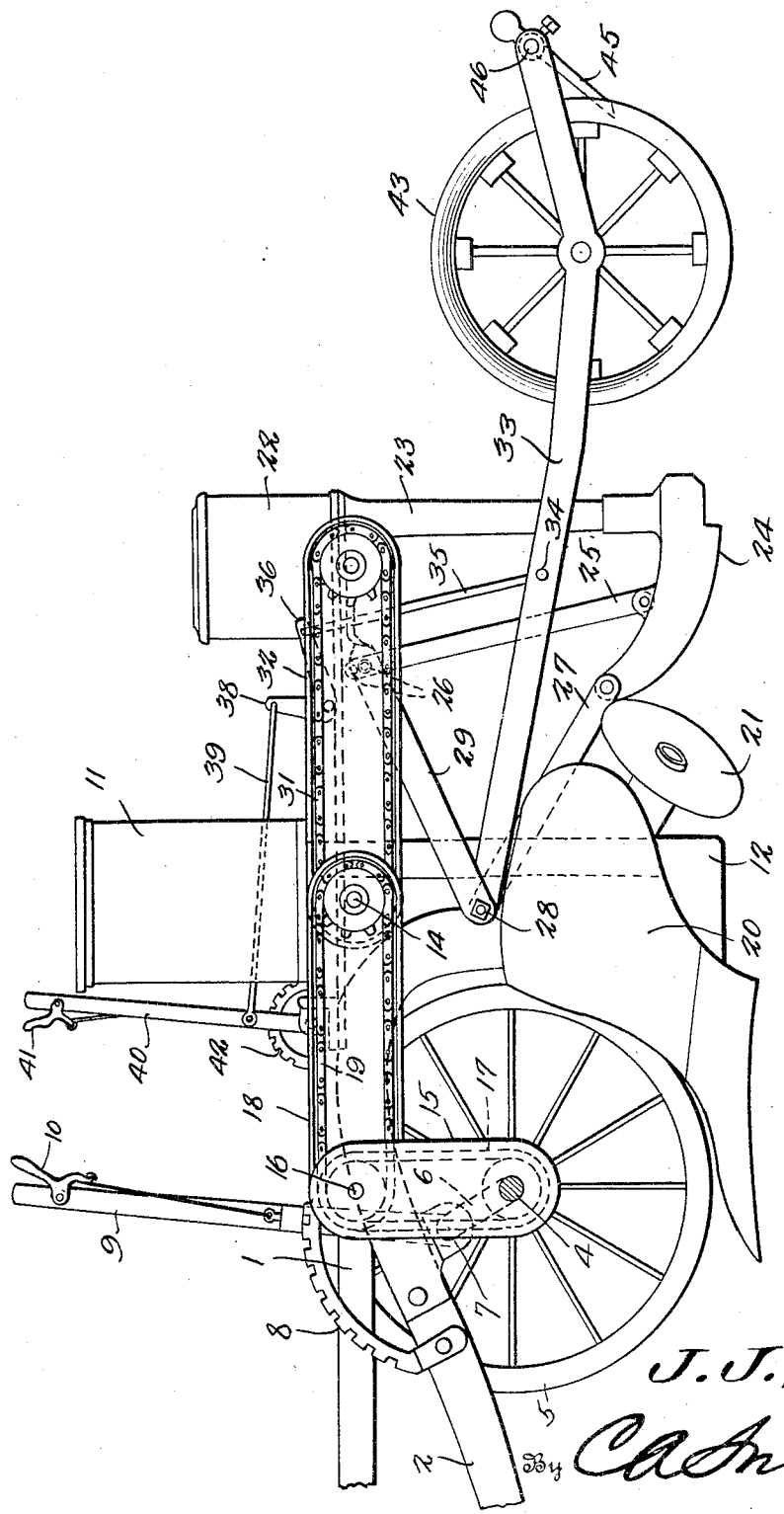
Figure 1 shows in side elevation, a lister mechanism in which the device forming the subject matter of this application has been embodied.

The device forming the subject matter of this application may be embodied in standard machines of many different sorts, but, by way of illustration, there is shown in the drawings a machine comprising a main frame 1 to which beams 2 are connected, as shown at 3, the beams carrying the furrow openers 20. Listers 21 are carried by the frame 1, and are disposed to the rear and slightly at one side of the furrow openers 20, as is common.

Axles 4 are provided, ground wheels 5 being journaled on the axles. The axles 4 have cranks 6, mounted at 7 to rock on the beams 2. Segments 8 are mounted on the beams 2. Levers 9 are secured to the inner ends of the cranks 6, and have latch mechanisms 10 adapted to cooperate with the segments 8, to form a raising and lowering mechanism well understood by those skilled in the art.

Fertilizer distributors 11 are mounted on the main frame 1 and discharge through shoes 12 disposed behind the furrow openers 20 and in advance of the listers 21. The fertilizer distributors 11 are operated by a transverse shaft 14.

The numeral 15 marks a substantially vertical casing in the upper end of which a shaft 16 is journaled. A chain and sprocket drive 17, located within the casing 15, connects one of the ground wheels 5 operatively with the shaft 16. A substantially horizontal casing 18 is mounted on the shafts 14 and 16 and within the casing 18 is disposed a chain and sprocket drive 19 which connects the shaft 16 with the shaft 14 that operates the fertilizer distributors 11.

Seeders 22 are mounted on the rear portion of the main frame 1 and discharge through telescopic tubes 23 into shoes 24 disposed to the rear of the listers 21. The lower ends of braces 25 are connected to the shoes 24, the upper ends of the braces being adjustably mounted at 26 on second braces 29 mounted on the frame 1, to enable the shoes 24 to be adjusted vertically. Links 27 are pivoted to the forward ends of the shoes 24, and are connected by a pivot bolt 28 with the beam 2. The braces 29 extend between the bolt 28 and the rear portion of the main frame 1.

The seeders 22 are operated by a transverse shaft 30 and this shaft is driven from the shaft 14 (which may be called a second shaft) by a chain and sprocket drive 31, located within a second casing 32 carried by the shafts 14 and 30.

Auxiliary frames 33 are mouned to swing vertically on the pivot elements 28 and extend rearwardly beyond the back end of the main frame 1. The auxiliary frames 33 are connected by a cross rod 34. Upwardly extended links 35 are connected at their rear ends to the cross rods 34, the forward ends of the links being pivoted to rearwardly extended arms 36 on a shaft 37 mounted to rock on the frame 1. The shaft 37 has an upstanding arm 38 to which is pivoted a forwardly extended connecting rod 39. The forward end of the connecting rod 39 is pivoted to a lever 40 mounted on the frame 1, the lever having a latch mechanism 41 adapted to cooperate with a segment 42 on the frame 1.

Packer wheels 43 are mounted to rotate in the auxiliary frames 33 and have concaved treads which are open, as shown at 44, on both sides of the median plane of each wheel 43. Scrapers 45 are adjustably mounted at 46 on the auxiliary frames 33 and engage the packer wheels 43, to clean them from dirt.

In practical operation, as the machine moves forwardly, the member 20 opens the furrow. The fertilizer is dropped through the shoes 12 into the furrows although a fertilizer distributor may or may not be used, as is found expedient. The listers 21 fill the furrow partially, and afford a properly prepared seed bed. The seed is dropped from the shoes 24 into the furrow at a comparatively shallow depth. Finally, the packer wheels 43 pass over the soil and, owing to the concaved shape of the track of the packer wheels, the seed is covered. Owing to the fact that the packer wheels are open at their median plane, as shown at 44, the soil immediately above the seed is not packed down unduly. The seed is deposited on earth that has been properly prepared to form a bed, and the seed is covered by dirt not so firmly compacted but that the sprouts can find their way upwardly without difficulty through the dirt. The device avoids all of the disadvantages incident to planting seeds, it being observed that, as shown in Figure 1, the shoe 24 that deposits the seed does not extend downwardly so far into the ground as does the furrow opener 20.

Owing to the construction embodied in the device, the lister can be run deeper, by several inches, than is customary, thereby breaking the way for better seed bed, prepared as hereinbefore described. Fertilizers, lime and the like, can be dropped down on the bottom of the furrow, where such material will do the most good, and the seed roots will go down to it. The seed which is planted will be in moist dirt, and the packer wheels 43, being open upon their treads will leave the seeds in fine shape to make a start.

The drive is simple; one of the ground wheels 5 operates the chain and sprocket drive 16, rotation being imparted to the shaft 16, the chain and sprocket drive 19 operating the shaft 14 of the fertilizer distributor 11 (which may be called a third shaft), and motion being transmitted from the shaft 14, by way of the chain and sprocket drive 31, to the shaft 40 which operates the seeders 22.

Through the instrumentality of the lever 40, the auxiliary frames 33 and the packer wheels 43 may be raised and lowered by a train of parts including the connecting rod 39, the arm 38, the shaft 37, the arms 36, and the links 35.

Having thus described the invention, what is claimed is:

1. An agricultural implement embodying a wheel-mounted main frame, a furrow opener carried thereby, a seeder on the main frame and including a shoe mounted for raising and lowering and located in the wake of the furrow opener, an auxiliary frame, a packer carried by the auxiliary frame and disposed behind the shoe, a downwardly and forwardly inclined brace having its rear end connected to the main frame, another brace having its lower end connected to the shoe, means for connecting the upper end of said other brace, adjustably to the first-specified brace, a forwardly extended link having its rear end connected to the forward portion of the shoe, and a pivot element connecting the auxiliary frame to a part of the furrow opener, the forward end of the link and the forward end of the first-specified brace being mounted on the pivot element.

2. In an agricultural implement embodying a main frame carrying a seeder having a shaft, a forward axle, a ground wheel journaled on the axle, means for raising and lowering the axle with respect to the frame, and a furrow opener carried by the main frame and located in advance of the seeder: mechanism whereby the shaft of the seeder is rotated from the ground wheel, said mechanism comprising a substantially vertical casing having its lower end mounted to swing on the axle, a second shaft journaled in the upper end of the casing, a chain and sprocket drive in the casing and connecting the ground wheel with the second shaft, a third shaft journaled on the frame between the casing and the seeder shaft, a second and substantially horizontal casing mounted for vertical swinging movement on the second and third shafts, a chain and sprocket drive in the second casing and connecting the second and third shafts, and means for driving the seeder shaft from the third shaft.

In testimony that I claim the foregoing as my own, I have hereto affixed my signature.

JOSEPH J. STEVENS.